United States Patent [19]

Hellriegel

[11] Patent Number: 5,020,277
[45] Date of Patent: Jun. 4, 1991

[54] VEHICLE WITH VEHICLE DOOR AND DOOR GASKET

[75] Inventor: Edmund Hellriegel, Pulheim, Fed. Rep. of Germany

[73] Assignee: Huels Troisdorf Aktiengesellschaft, Troisdorf, Fed. Rep. of Germany

[21] Appl. No.: 490,386

[22] Filed: Mar. 8, 1990

Related U.S. Application Data

[63] Continuation of Ser. No. 131,711, Dec. 11, 1987, abandoned.

[30] Foreign Application Priority Data

Dec. 11, 1986 [DE] Fed. Rep. of Germany ....... 3642428

[51] Int. Cl.⁵ .............................................. E06B 7/23
[52] U.S. Cl. .................................... 49/400; 49/485
[58] Field of Search ........................... 49/400–402, 49/479, 485, 496, 497; 296/146, 206

[56] References Cited

U.S. PATENT DOCUMENTS

| 1,991,674 | 2/1935 | Hughes | 49/485 |
|---|---|---|---|
| 2,091,747 | 8/1937 | Accardi | 49/485 |
| 2,138,523 | 11/1938 | Haberstump | 49/400 X |
| 3,198,572 | 8/1965 | Stolarczyk | |
| 3,596,980 | 8/1971 | Cadiou | 49/485 X |
| 4,405,173 | 9/1983 | Piano | 296/146 |
| 4,708,898 | 11/1987 | Gommier et al. | 49/497 X |

FOREIGN PATENT DOCUMENTS

| 102556 | 3/1984 | European Pat. Off. | |
| 745618 | 12/1943 | Fed. Rep. of Germany | 49/485 |
| 1282283 | 11/1968 | Fed. Rep. of Germany | |
| 833934 | 11/1938 | France | 49/485 |
| 2075582 | 11/1981 | United Kingdom | |

Primary Examiner—James R. Brittain
Attorney, Agent, or Firm—Antonelli, Terry, Stout & Kraus

[57] ABSTRACT

A vehicle including at least one vehicle door having a peripheral are surrounding door gasket wherein a hinge or swivel axis penetrates the vehicle body so that the vehicle door, in such a manner that the vehicle door during opening, is moved in a partial zone toward the interior of the vehicle and in the remaining region in an opposite direction, and with the door gasket is located so that it completely seals the external or outer door gap, formed between the vehicle or outer door and the body, at or in the immediate vicinity of the outer wall of the door.

21 Claims, 6 Drawing Sheets

VEHICLE WITH VEHICLE DOOR AND DOOR GASKET

This is a continuation division of application Ser. No. 131,711, filed Dec. 11, 1987, abandoned.

BACKGROUND OF THE INVENTION

The present invention relates to a vehicle and, more particularly, to a vehicle with at least one vehicle door and a peripheral or surrounding door gasket or weatherstrip, with the vehicle door including an outer wall and an inner wall, and with the vehicle door being swingable articulated to the vehicle body by at least one hinge whereby the vehicle door, in a closed condition, and the associated vehicle door opening of the body form a cavity extending around the vehicle door, and wherein the swivel axis of the vehicle door passes through the cavity between the vehicle door and the vehicle body in such a manner that a partial zone of an outer wall of the vehicle door, during an opening of the vehicle door, is moved toward an interior of the vehicle and a remaining region of the outer wall of the vehicle door is moved in an opposite direction, with the surrounding door gasket sealing or waterproofing the cavity between the vehicle body and the vehicle door.

Figures 1A, 1B:
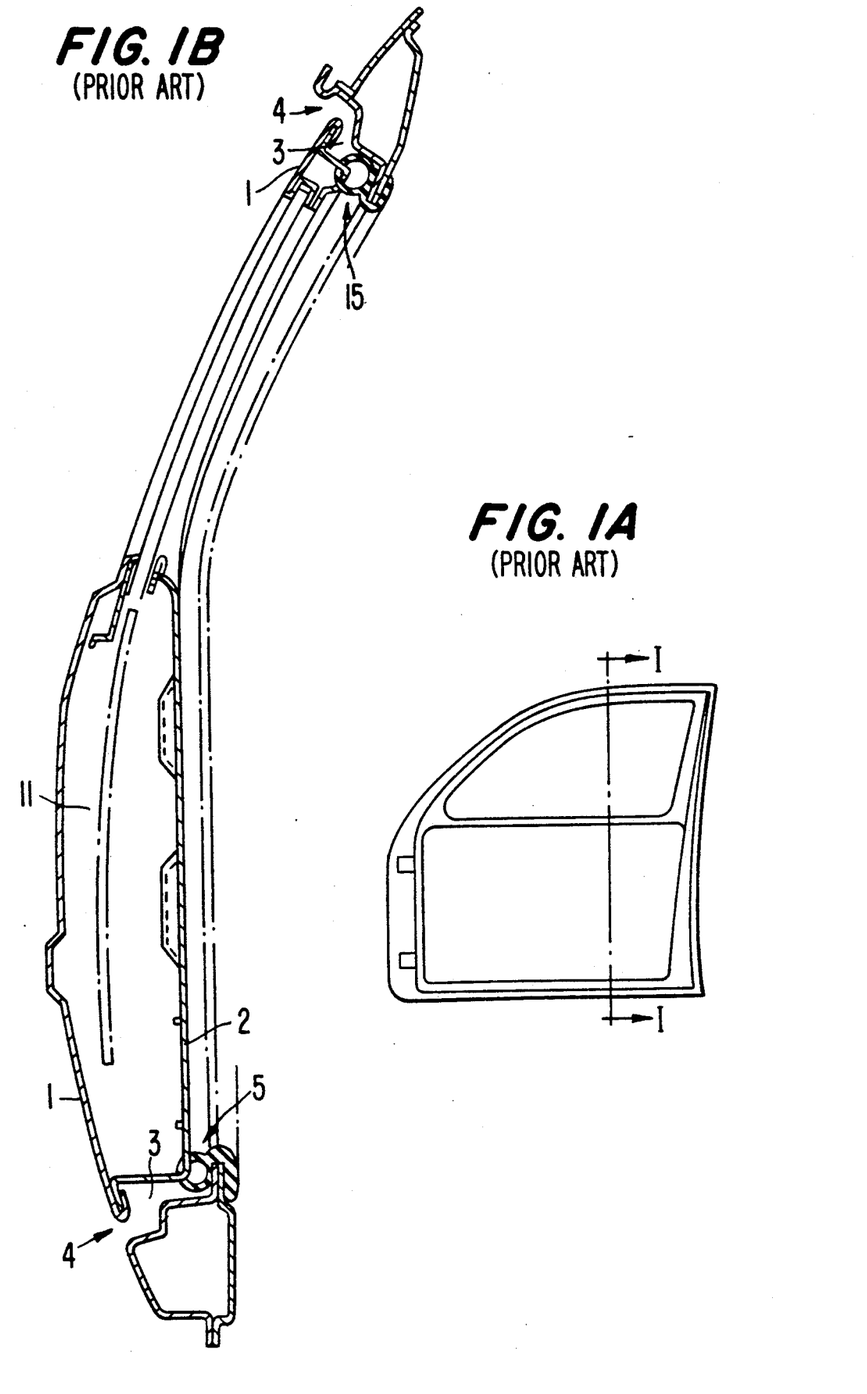
FIG. 1A is a schematic plan view of a vehicle door constructed in accordance with the state of the art as a comparative example.
FIG. 1B is a partially schematic cross-sectional view taken along the line I—I in FIG. 1A.

Vehicles of this type have been known for a long time. FIGS. 1A, 1B, show, for purposes of explanation, a cross-sectional view of a vehicle door of this type with the corresponding boundary profiles of the body. The vehicle door 11 comprises an outer wall 1 and an inner wall 2 arranged at a spacing with respect to the outer wall. The doors of a vehicle of this type are articulated to the vehicle body so that they can swivel by means of generally respectively two, hinges.

In the closed condition, the vehicle door and the corresponding door opening or cutout of the vehicle body form a cavity 3 having a variable cross section extending around the vehicle door 11, and outer gap generally designated by the reference numeral 4 and an inner gap generally designated by the reference numeral 5; with the corresponding door cutout of the body; this cavity extends around the door 11. The hinges of the vehicle doors of a vehicle pertaining to this kind are normally arranged within the surrounding cavity so that the swivel axis A of the vehicle door passes through the cavity between the vehicle door and the vehicle body. The arrangement of the swivel axis, as seen in the driving direction—behind the foremost edge of the outer door wall has the result that the partial zone of the outer door wall lying in front of the swivel axis is moved, during opening of the vehicle door, toward the interior of the vehicle, while the portion of the outer door wall lying behind the swivel axis executes an opposed swivel motion, i.e. is moved away from the interior of the vehicle.

Since the inner door wall normally exhibits smaller dimensions than the outer door wall and is located, as seen in the driving direction, entirely behind the swivel axis, the inner door wall, during opening of the door, moves uniformly toward the outside. Therefore, in accordance with the state of the art, it is customary to arrange a continuously extending surrounding gasket in the door cutout of the body in such a way that the vehicle door is sealed with respect to the vehicle body along the inner door gap 5 (FIG. 1).

This conventional arrangement of a door gasket for vehicles of this type has the disadvantage that the peripheral cavity formed between the vehicle door and the surrounding door cutout of the vehicle body is not sealed with respect to the outside against penetrating water and dirt which, when vehicle occupants enter the vehicle, are transferred to the occupants' clothing. Furthermore, the surrounding cavity constitutes a resonator for wind noises that can be generated at the outer, open door gap (door gap 4 according to FIG. 1).

It has been known, to lessen these drawbacks, to seal partial zones of the outer door gap by means of additional gaskets mounted to the vehicle body in the peripheral cavity, but these measures cause additional expenses.

U.S. Pat. 3,198,572 discloses a vehicle not of this type, having a door and a peripheral door gasket wherein a peripheral door gasket seals the inner door gap at the front, i.e. in the proximity of the hinge, and seals the outer door gap at the rear, i.e. in the proximity of the lock. In addition to this peripheral door gasket, an additional gasket, not extending continuously, is mounted in the frontal zone for sealing the outer door joint. The provision of this additional, externally located door gasket according to U.S. Pat. 3,198,572 requires an expensive hinge construction wherein the hinge axis is located in front of the forward door edge so that the door during opening is swung toward the outside also in the frontal zone.

Also, vehicles have been known exhibiting hinges lying outside of the outer skin of the vehicle, with a hinge axis extending correspondingly outside of the outermost vehicle contour, the vehicle door thereof having been equipped with a door gasket sealing the outer door gap. In these vehicles, not of the present type, the entire vehicle door including the outer door wall executes, during opening of the door, a uniform swivel motion toward the outside.

It is an object of this invention to structure a vehicle of the present type, with at least one vehicle door and with a surrounding or door gasket, so that the above discussed drawbacks, such as entrance of water and dirt, as well as noises in the surrounding cavity between the vehicle door and the door cutout of the vehicle body, are avoided.

In accordance with advantageous features of the present invention, a vehicle with at least one vehicle door and surrounding door gasket is provided wherein the surrounding door gasket is arranged at the vehicle body or at the vehicle door in such a manner that the outer door gap formed between the outer wall of the vehicle door and the body of the vehicle is completely sealed at or in the immediate vicinity of the other door.

The arrangement of the peripheral door gasket at or in the immediate vicinity of the outer door wall in such a way that the outer door joint is sealed off has the effect that it is impossible for either water or dirt or noises to penetrate into the peripheral cavity between the vehicle door and the vehicle body, in the closed condition of the door.

The continuously extending surrounding gasket can be mounted according to the present invention either to the vehicle body or, preferably, to the vehicle door.

In accordance with a preferred embodiment of the invention, the peripheral gasket is attached in this arrangement to a mounting web, or fixing rib likewise extending around the door body and fashioned, in particular, as an integral component of the outer door wall. This mounting web or fixing rib is oriented essentially from the vehicle interior toward the outside in the zone of the outer door wall that is moved, during opening of the vehicle door, toward the interior of the vehicle. In the remaining region of the outer door wall lying, as seen in the driving direction, behind the swivel axis and thus performing a swiveling motion toward the outside, the mounting web is correspondingly oriented toward the interior of the vehicle. In the transitional zone between the zone of the outer door wall lying in front of the hinge axis and the door zone lying behind the hinge axis, the direction of the mounting web is constantly rotated by about 180°. In this way, sliding of the door gasket along the contact surface of the gasket at the body is precluded. In this preferred embodiment of the invention, the door gasket is, with the vehicle door being closed, in contact with the peripheral contact surface of the body along the entire periphery of the gasket, with uniform contact pressure.

A preferred embodiment of the invention provides that the swivel axis intersects or preferably is tangent on the peripheral door gasket in the transitional zone at two locations, namely, at the upper door contour and the lower door contour. This achieves the result that the door gasket, during opening of the vehicle door, executes at this location a rolling motion with respect to the contact surface of the body.

Preferably, the door gasket is designed to be of one piece as a hollow chamber profile. In this arrangement, the gasket can be composed by gluing from several segments to form a continuous, approximately annular gasket; or it can be manufactured directly by casting or preferably by extrusion in one piece.

The production of the surrounding or peripheral gasket according to this invention by means of an extrusion process is of special advantage, the ends of a corresponding section being joined by cementing (vulcanizing). A one-piece door gasket manufactured in this way by extrusion has an identical cross section at any location.

Preferably, the door gasket is attached by placing it on a correspondingly designed mounting web at the vehicle door, preferably at the outer door wall, by means of a clamping profile insert integrated into the door gasket. The clamping profile insert exhibits, in this arrangement, an approximately U-shaped configuration in cross section.

According to another embodiment of the invention, the door gasket is designed as a hollow chamber profile molding having an approximately annular (oval or circular) cross section. The door gasket can advantageously exhibit at least two sealing lips projecting, especially radially, from the outer contour of the door gasket. This has the effect that the door gasket mounted to the door is in contact with the door cutout of the body along two or more peripheral contact surfaces. This substantially enhances the sealing action.

The vehicle door is preferably designed as a synthetic resin structure; especially for the outer wall, the RRIM (reinforced reaction injection molding) method is preferred. In this embodiment of the invention, the one-piece integration of a peripheral mounting web for the door gasket can be realized in an especially simple way.

In the preferred embodiment of the invention wherein the surrounding gasket is attached to the door, the vehicle body has a peripheral contact surface for the gasket. This peripheral contact surface is preferably fashioned, as seen in cross section, to be slightly curved; the radius of this curvature should correspond approximately to the likewise round shape of the surrounding gasket.

However, it is also possible to attach the surrounding gasket to the vehicle body. In this case, a surrounding contact surface for the peripheral gasket is provided at the vehicle door.

In accordance with an especially preferred embodiment of the invention, the provision is made that the surrounding gasket, during closing of the vehicle door, impinges upon the surrounding contact surface at such an angle that the surrounding gasket is pressed essentially without any sliding motion, i.e. without friction with respect to the contact surface, against the latter and is elastically compressed during this step. The surrounding gasket should, in particular, impinge upon the contact surface as perpendicularly as possible, i.e. in the direction of the normal of the surface. This ensures that there will be no friction between the gasket and the contact surface.

Under certain circumstances, a certain sliding friction between the gasket and the contact surface cannot be entirely avoided in the two zones of the door circumference wherein the hinge axis extends in the immediate vicinity of the door gasket, since at these locations the gasket can be constantly in contact with the contact surface even with the door being opened. However, by means of imparting to the contact surface a corresponding configuration, the objective can be attained that, in these regions, there is predominantly a rolling motion between the gasket and the contact surface so that friction is extensively avoided.

In accordance with another preferred embodiment of the invention, the provision is made to arrange a second sealing surface in addition to the peripheral contact surface at the vehicle body in partial zones or likewise extending all around.

The invention will be described in greater detail below with reference to the drawings.

BRIEF DESCRIPTION OF THE DRAWINGS

FIG. 2 is a plan view of the vehicle door constructed in accordance with the present invention;

DETAILED DESCRIPTION

Referring now to the drawings wherein like reference numerals are used throughout the various views to designate like parts and, more particularly, to FIGS. 2, 2A, 2B, in accordance with the present invention, the vehicle door 11 includes shell-like outer wall 1 and an attached inner wall 2 which terminates at a position below an opening for a window of the vehicle door 11. The outer wall 1 and inner wall are manufactured by a reinforced reaction injection molding (RRIM) technique, with a skeleton reinforcement 14 (FIGS. 3A–3C and FIGS. 4C–4E) being integrated into the outer wall 1. The swivel or hinge axis 1 defined by the hinges 13 divides the vehicle door into a zone lying, as viewed in a driving direction, in the front of the swivel or hinge axis A, that is to the left of the swivel or hinge axis A in FIG. 2 and into a zone lying behind the swivel or pivot axis A, that is, to the right of the hinge axis A.

Figure 2A:
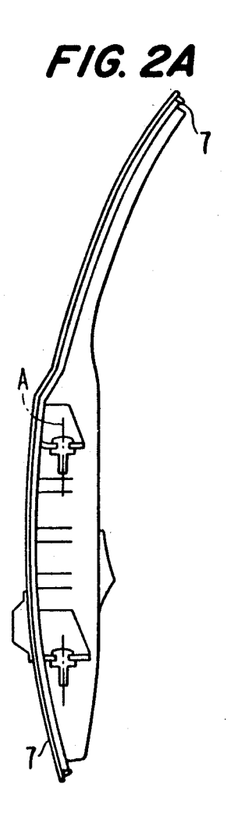
FIG. 2A is an end view of the vehicle door of FIG. 2.
Figures 2B, 2C:
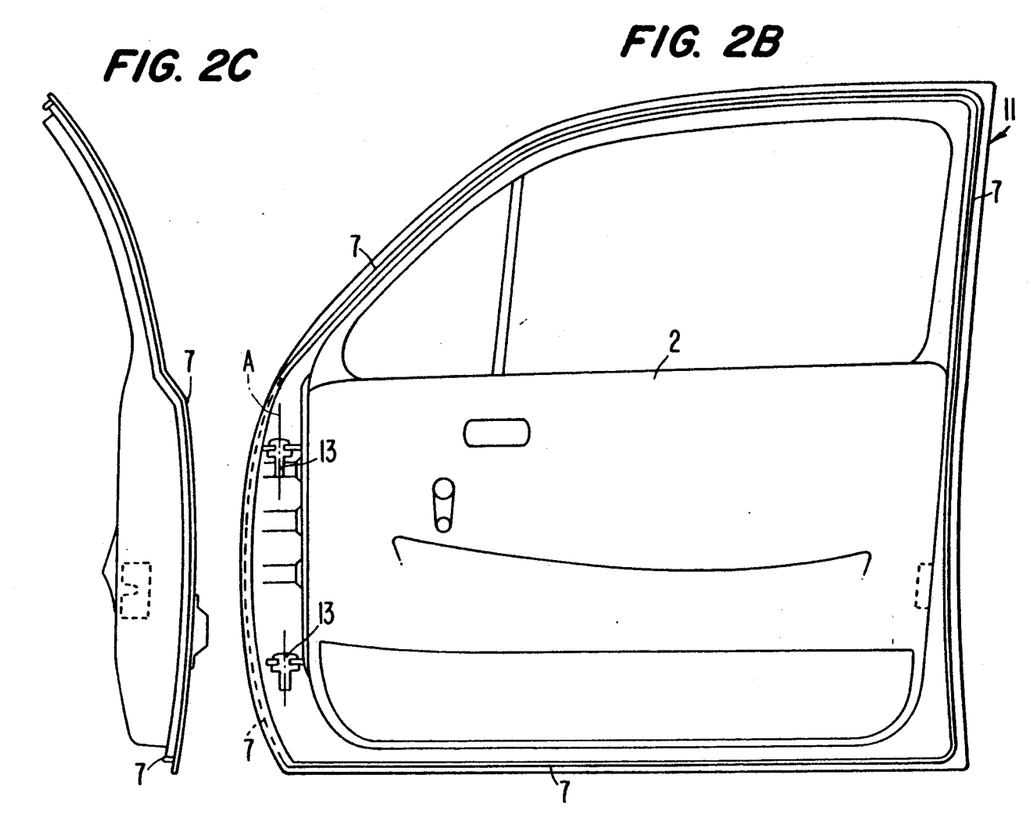
FIG. 2B is an opposite end view of the vehicle door of FIG. 2 taken in the direction of the arrow 2B.

The vehicle door 11 exhibits, as show in FIGS. 2–2B, a mounting web 7 extends all around along the outer door contour, for attaching a surrounding door gasket 6. This mounting web 7 is arranged, in a zone or region to the right of the swivel axis (FIG. 2) on the inside of the outer wall 1 and points approximately perpendicularly toward the interior of the vehicle.

In the region to the left of the swivel axis (FIG. 2), the mounting web 7 is located on the outside of the outer wall 1 and points approximately perpendicularly from the interior of the vehicle toward the outside.

The hinges 13 are arranged at the vehicle door 11 in such a way that the hinge axis A is tangent on the door gasket 6, placed onto the mounting web 7, at both points B and B' (according to FIG. 2). This has the result that the door gasket 6 in this region describes a rolling motion with respect to the corresponding contact surface at the vehicle body 12.

In FIGS. 3A, 3B, 3C, 3D and 3E the sectional illustrations depict the spatial position of the hinge axis A as well as a segment of the vehicle body 12 and it can be seen that the mounting web 7 executes, in the illustrated zone (turning zone), a rotation by about 180°.

Figure 3:
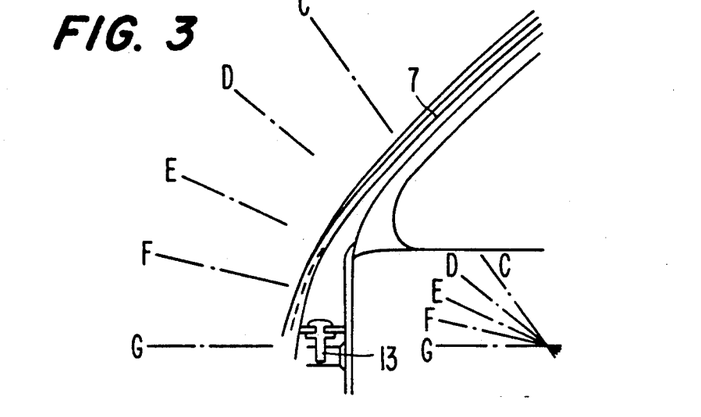
FIG. 3 is a partially schematic view of a vehicle door constructed in accordance with the present invention.
Figure 3A:
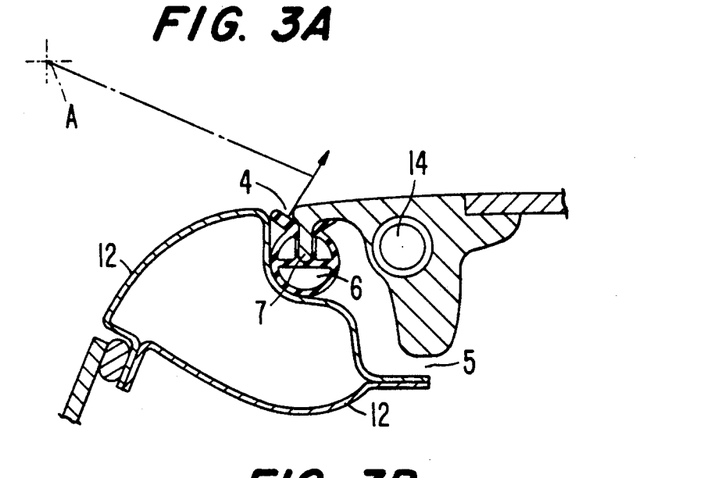
FIG. 3A is a cross-sectional view taken along the line C—C in FIG. 3.
Figure 3B:
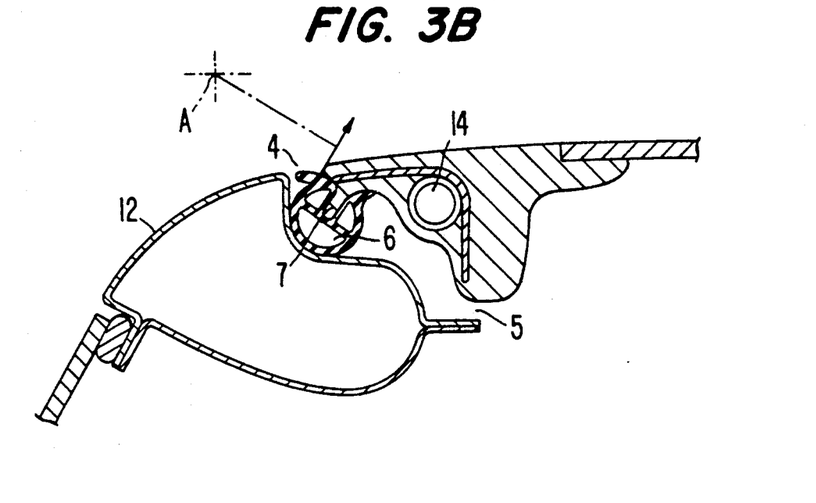
FIG. 3B is a cross-sectional view taken along the line D—D in FIG. 3B.
Figure 3C:
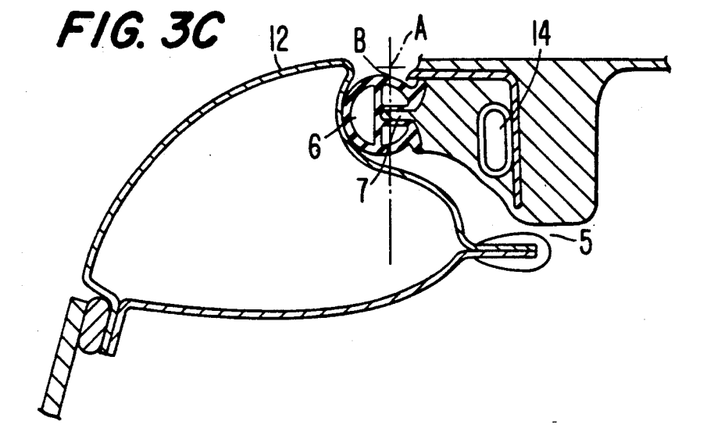
FIG. 3C is a cross-sectional view taken along the line E—E in FIG. 3.
Figure 3D:
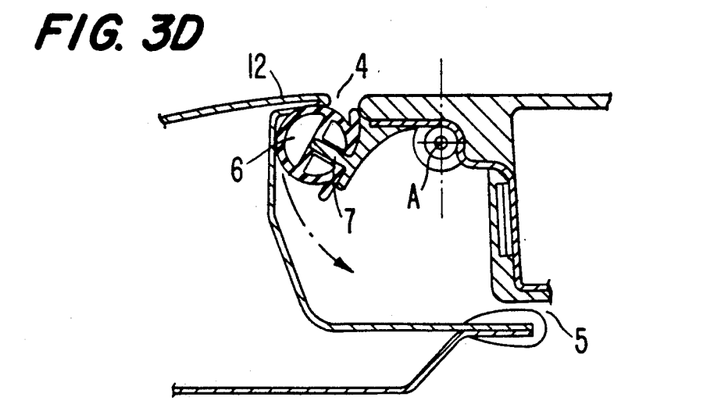
FIG. 3D is a cross-sectional view taken along the line F—F in FIG. 3.
Figure 3E:
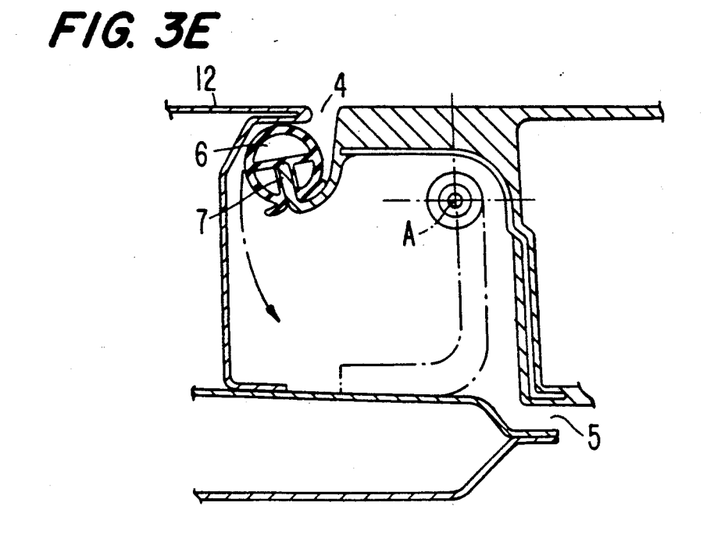
FIG. 3E is a cross-sectional view taken along the line G—G in FIG. 3.
Figure 4:
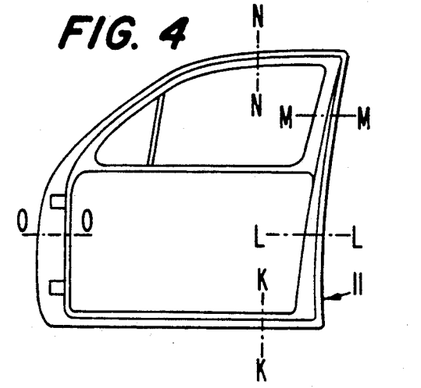
FIG. 4 is a plan view of a vehicle door constructed in accordance with the present invention.
Figure 4A:
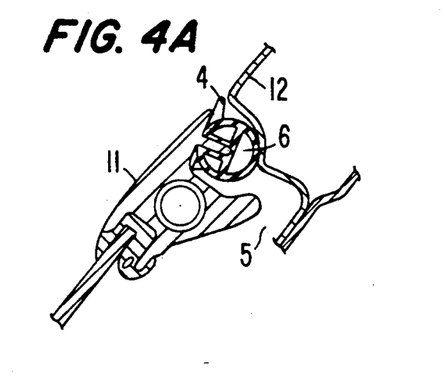
FIG. 4A is a partial cross-sectional view taken along the line N—N in FIG. 4.
Figure 4B:
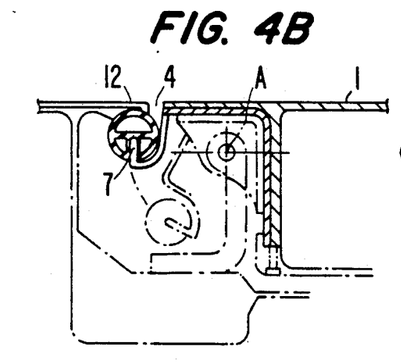
FIG. 4B is a partial cross-sectional view taken along the line O—O in FIG. 4.
Figure 4C:
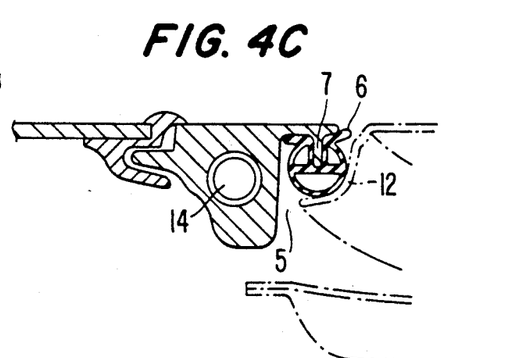
FIG. 4C is a cross-sectional view taken along the line M—M in FIG. 4.
Figure 4D:
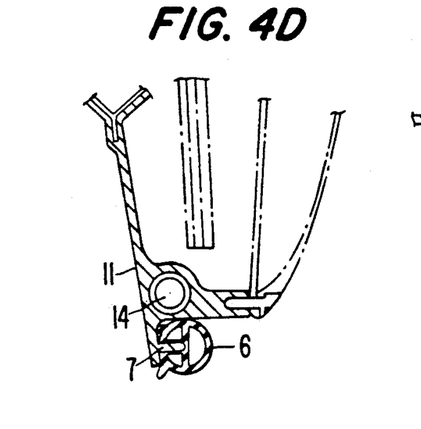
FIG. 4D is a partial cross-sectional view taken along the line K—K in FIG. 4.
Figure 4E:
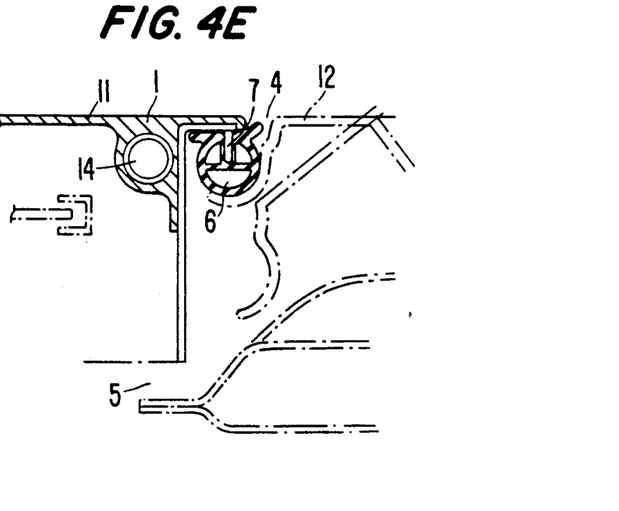
FIG. 4E is a partial cross-sectional view taken along the line L—L in FIG. 4.

In FIG. 3C the swivel axis A is precisely tangent on the door gasket 6; the mounting web 7 points, in this position, approximately into the driving direction. In FIG. 3E the mounting web, as seen in the driving direction is located in front of the swivel axis A. During opening of the vehicle door 11, the mounting web executes a circular movement about the swivel axis A toward the interior of the vehicle. Correspondingly, the mounting web 7 is oriented approximately perpendicularly from the interior of the vehicle toward the outside, so that the peripheral door gasket 6 seals the outer door gap 4, lying between the outer wall 1 of the vehicle door 11 and the body 12, at the outer door wall 1.

As shown in FIG. 3A, the mounting web 7 is located as seen in the driving direction behind the swivel axis A. The web describes, during opening of the vehicle door 11, a circular movement about the swivel axis A toward the outside. Correspondingly, the mounting web 7 points approximately perpendicularly toward the interior of the vehicle so that the peripheral door gasket 6 seals or water proofs the outer door gap 4, lying between the outer wall 1 of the vehicle door 11 and the body 12, in the proximity of the outer door wall 1.

FIGS. 4, 4A, 4B, 4C, 4D and 4E illustrate additional sections of the vehicle door 11 as well as of the corresponding door cutout of the vehicle body 12 according to FIG. 2.

Figure 5:
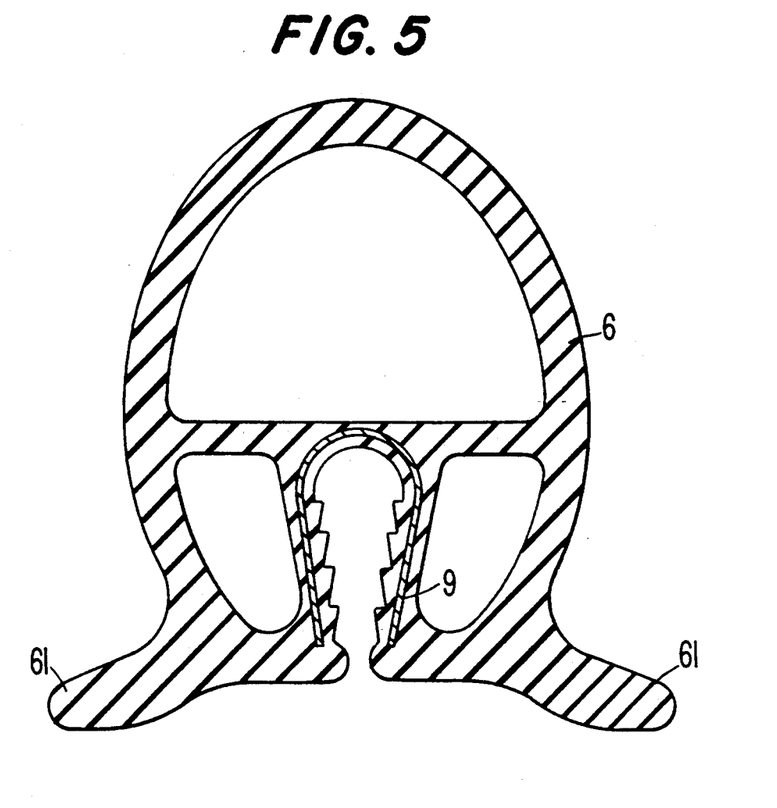
FIG. 5 is a cross-sectional view of a door gasket constructed in accordance with the present invention.

FIG. 5 shows a preferred embodiment of the door gasket 6. The door gasket 6 herein has an approximately oval cross section with two attached, radially outwardly oriented sealing lips 61. An approximately U-shaped steel profile 9 is integrated into the door gasket 6 in order to ensure the clamping action of the door gasket 6 on the mounting web 7.

Figure 6:
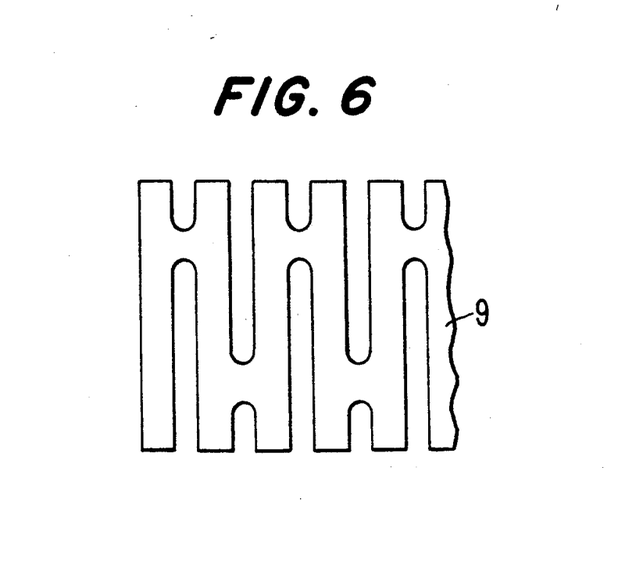
FIG. 6 is a developed view of the U-shaped clamping insert of FIG. 5.

In order to ensure adaptability of the door gasket 6, especially in the turning zone, the clamping profile insert 9 is punched out as shown in FIG. 6.

By means of the arrangement of a the surrounding gasket at the outer door gap, according to this invention, it is possible for the first time to equip also those vehicles with an outwardly located, peripheral door gasket wherein the swivel axis extends within the outer vehicle contours and between the forward and rearward door edges.

What is claimed is:

1. A vehicle with a vehicle body, at least one vehicle door, an associated vehicle door opening, at least one surrounding door gasket, and at least one surrounding contact surface for accommodating said surrounding door gasket, the vehicle door including:

an outer wall;

an inner wall arranged at a spacing with respect to the outer wall;

at least one hinge means for pivotably articulating the vehicle door to a vehicle body, said hinge means defining a pivot axis for the vehicle door;

a surrounding cavity formed between the vehicle door and the associated vehicle door opening when the vehicle door is closed, said surrounding cavity extending around the vehicle door;

said pivot axis of the vehicle door passes through said surrounding cavity between the vehicle door and the vehicle body in such a manner that a partial zone of the outer wall of the vehicle door, during an opening of the vehicle door, is moved toward an interior of the vehicle, and a remaining region of the outer wall of the vehicle door is moved in the opposite direction;

said surrounding door gasket seals the surrounding cavity between the vehicle body and the vehicle door, and is arranged at one of the vehicle body or the vehicle door in such a manner that an outer door gap formed between the outer wall of the vehicle door and the vehicle body is one of completely sealed at or in an immediate vicinity of the outer door wall; and wherein said surrounding door gasket includes means, during a closing of the vehicle door, for impinging upon said surrounding contact surface at such an angle that said surrounding door gasket is urged against said surrounding contact surface essentially without a sliding motion at all portions thereof and is compressed during the closing of the vehicle door at all portions thereof.

2. A vehicle according to claim 1, wherein the surrounding door gasket extends within the surrounding cavity formed by the vehicle door and the associated vehicle door opening of the vehicle body.

3. A vehicle according to claim 2, further comprising a surrounding mounting web means for enabling the surrounding door gasket to be attached to the vehicle door.

4. A vehicle according to claim 3, wherein the mounting web means, in a zone moved during an opening of the vehicle door toward an interior of the vehicle, extends essentially from an interior of the vehicle toward an outside thereof and, in a zone moved in an opposite direction during the opening movement of the vehicle door, extends essentially toward the interior of the vehicle.

5. A vehicle according to claim 4, wherein the pivot axis of the vehicle door intersects the surrounding door gasket at two points.

6. A vehicle according to claim 4, wherein the pivot axis of the vehicle door is tangent to the surrounding door gasket.

7. A vehicle according to one of claims 5 or 6, wherein the surrounding door gasket is fashioned as a one piece member.

8. A vehicle according to claim 7, wherein the surrounding door gasket has an at least approximately identical cross sectional configuration at all portions thereof.

9. A vehicle according to claim 8, wherein a clamping profile insert means is arranged in the surrounding door gasket for enabling an attachment to the mounting web means.

10. A vehicle according to claim 9, wherein the clamping profile insert means has a substantially U-shaped cross-sectional configuration.

11. A vehicle according to claim 9, wherein the surrounding door gasket has an approximately annular cross-section and includes a plurality of sealing lip means arranged in a stellate pattern.

12. A vehicle according to claim 3, wherein the surrounding contact surface of the surrounding door gasket is attached to the vehicle door.

13. A vehicle according to claim 1, wherein the surrounding contact surface for surrounding the surrounding gasket is attached to the vehicle body.

14. A vehicle according to claim 1, further comprising a surrounding mounting web means for enabling the surrounding door gasket, to be attached to the vehicle door.

15. A vehicle according to claim 1, wherein the pivot axis of the vehicle door intersects the surrounding door gasket at two points.

16. A vehicle door according to claim 1, wherein the pivot axis of the vehicle door is tangent to the surrounding door gasket.

17. A vehicle according to claim 1, wherein the surrounding door gasket has an at least an approximately identical cross-sectional configuration at all portions thereof.

18. A vehicle according to claim 1, wherein a clamping profile insert means is arranged in the surrounding door gasket for enabling an attachment to a mounting web means provided on the vehicle door.

19. A vehicle according to claim 18, wherein the clamping profile insert means has an approximately U-shaped cross-sectional configuration.

20. A vehicle according to claim 1, wherein the surrounding door gasket has an approximately angular cross-section and includes a plurality of sealing lip means arranged in a stellate pattern.

21. A vehicle according to claim 1, wherein the surrounding contact surface for the surrounding gasket attached to the vehicle door.

* * * * *